Aug. 27, 1968  C. R. BRADLEY  3,398,733
COMBINATION BARBECUE SMOKER LEAF BURNER
Filed March 4, 1966  2 Sheets-Sheet 1
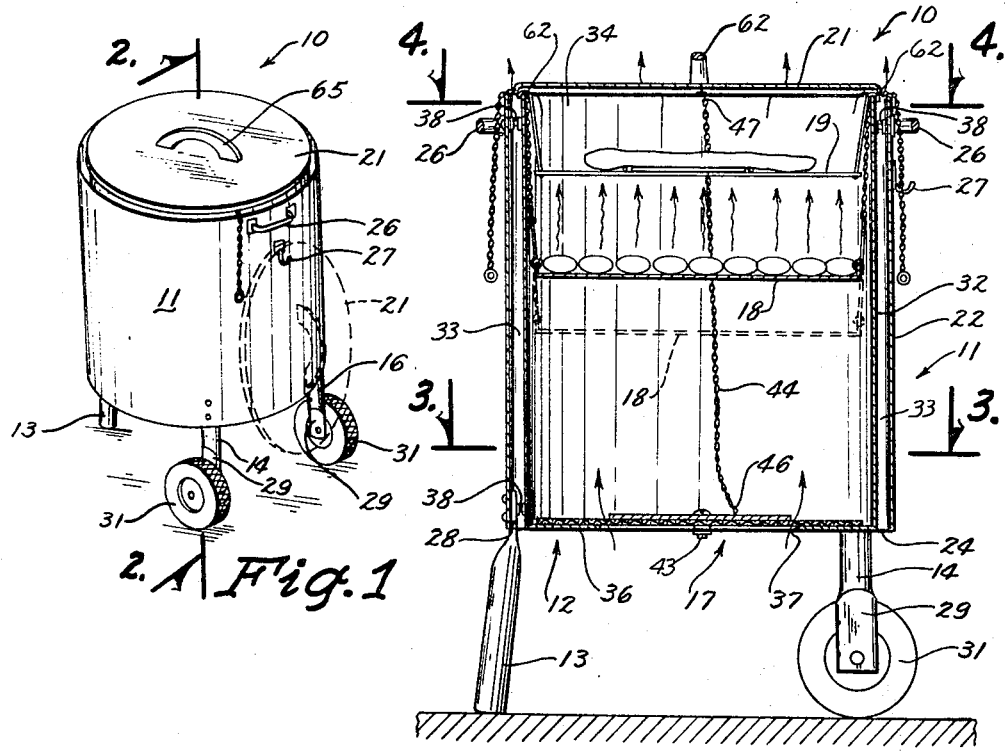
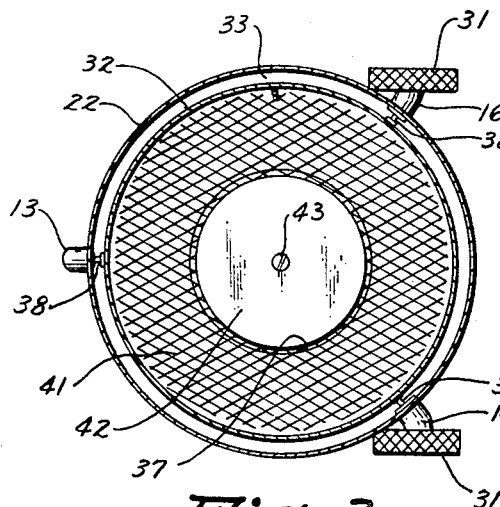
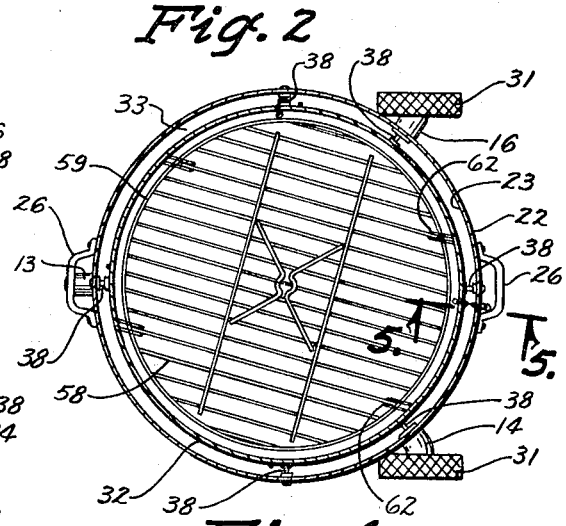
INVENTOR
CARL R. BRADLEY
BY
J. Robert Henderson
ATTORNEY

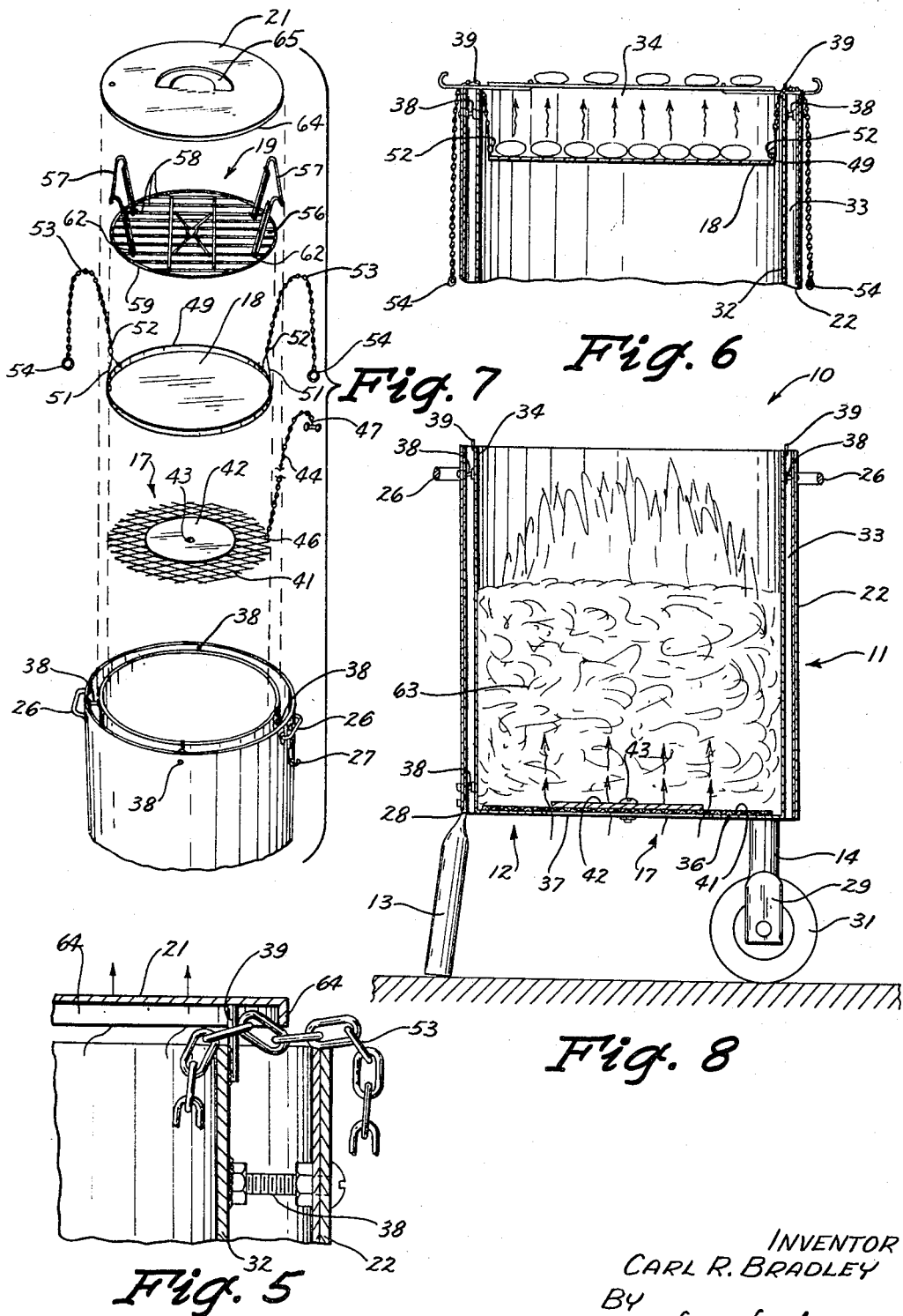

United States Patent Office 3,398,733
Patented Aug. 27, 1968

3,398,733
COMBINATION BARBECUE SMOKER
LEAF BURNER
Carl R. Bradley, Farnhamville, Iowa 50538
Filed Mar. 4, 1966, Ser. No. 531,665
7 Claims. (Cl. 126—25)

ABSTRACT OF THE DISCLOSURE

This invention pertains to a combination incinerator and barbecue grill wherein a cylindrical, upright housing is mounted within a cylindrical, upright portable casing providing thereby an air space therebetween, and with a foraminous base mounted in the housing for holding trash, leaves, or the like for burning purposes, the air coming up through the foraminous base, with an upper removable grate suspended from the top edge of the housing for holding food to be cooked, and with an intermediate removable grate mounted below the upper grate, also in a suspended manner relative to the upper edge of the housing, the intermediate grate adapted to hold charcoal, briquettes and the like for heating the food being cooked.

---

This invention relates to a combination incinerator and barbecue grill.

An object of this invention is the provision of a combination incinerator and barbecue grill which can be used either for the incineration of leaves and trash, or for the barbecuing of food.

Another object of this invention is to provide a combination incinerator and barbecue grill having a double wall with an air passage therebetween wherein, the outer wall will be cool during use.

A further object of this invention is the provision of a combination incinerator and barbecue grill wherein the ashes and debris can be easily removed.

A still further object of this invention is the provision of a combination incinerator and barbecue grill which can be easily moved from one location to another.

Yet another object of this invention is to provide a combination incinerator and barbecue grill which is economical to manufacture, extremely functional in use and appearance, and simple but rugged in construction.

These objects, and other features and advantages of this invention will become more readily apparent upon reference to the following description, when taken in conjunction with the accompanying drawings, wherein:

FIG. 1 is a perspective view of the combination incinerator and barbecue grill of this invention;

FIG. 2 is a sectional view taken along the line 2—2 in FIG. 1;

FIG. 3 is a sectional view taken along the line 3—3 in FIG. 2;

FIG. 4 is a sectional view taken along the line 4—4 in FIG. 2;

FIG. 5 is an enlarged, fragmentary, sectional view taken along the line 5—5 in FIG. 4;

FIG. 6 is a fragmentary sectional view showing the apparatus when used as a barbecue grill;

FIG. 7 is a fragmentary perspective view illustrating a portion of the parts in unassembled relation to each other; and FIG. 8 is a section view showing the apparatus when used as an incinerator.

The combination incinerator and barbecue grill apparatus of this invention is indicated generally at 10 in FIG. 1, and is used either for the incineration of trash and leaves or for the barbecuing of food.

Generally, the apparatus 10 (FIG. 2) comprises an outer casing element 11; and inner housing element 12 mounted inside of the casing 11; a trio of legs 13, 14, and 16 mounted on the casing 11 and depending therefrom for supporting the casing 11; an incinerator grate element 17, a barbecue grate element 18 and a grill device 19, all movably disposed within the housing 11; and a cover 21 movably disposed on the housing 12.

More specifically, the casing element 11 (FIGS. 2 and 4) includes a vertically disposed cylindrical outer shell 22 open at the top 23 and the bottom 24. A pair of handles 26, disposed diametrically of each other, are mounted on the outer shell 22 and near the top 23 thereof. The handles 26 extend outwardly from the outer shell and are graspable for moving the apparatus 10. Mounted on the outer shell 22, and extending outwardly therefrom and immediately below one of the handles 26 is a hook 27. The purpose of the hook 27 will be described hereinafter.

It will be noted in FIGS. 1 and 2 that the arcuately spaced legs 13, 14 and 16 are each formed from a section of pipe, wherein the upper end 28 thereof is crimped to form a flat surface. The end 28 is secured to the inner wall of the outer shell 22 as best noted in FIG. 2. Two of the legs 14 and 16 are shorter than the leg 13 and both are crimped on the lower end 29 to form a flat surface. A wheel 31 is rotatably mounted on each of the shorter legs 14 and 16 whereby the outer shell is maintained in a substantially level position.

The housing element 12 (FIGS. 2 and 4) includes a vertically disposed cylindrical inner shell 32 which is spaced inwardly from the outer shell 22, so as to provide an air passage 33 therebetween. The air passage 33 substantially prevents the transfer of heat and insulates the outer shell 22 from the inner shell 32. The inner shell 32 is open at the top 34 and closed at the bottom 36. A circular aperture 37 is centrally formed in the bottom 36, for the purpose of providing a draft opening to the interior of the inner shell 32.

A plurality of arcuately spaced holding devices 38, as best noted in FIG. 5, are secured to both the inner shell 32 and the outer shell 22, with one set thereof disposed near the top of the apparatus 10 (FIG. 7) and a second set thereof disposed near the bottom of the apparatus 10 (FIG. 3). The holding devices 38 both support and space the inner shell 32 relative to the outer shell 22.

A pair of upstanding and diametrically spaced projections 39 are mounted on the inner shell 32 as best noted in FIGS. 5 and 8. The purpose of the projections 39 will be described hereinafter.

The incinerator grate element 17 (FIGS. 7 and 8) includes a cylindrically shaped foraminous bottom 41 which is normally, horizontally disposed on the bottom 36. The diameter of the foraminous bottom 41 is slightly smaller than the diameter of the inner shell 32 for the purpose of facilitating the seating and removal of the incinerator grate element 17 from the inner shell 32. Centrally mounted on the foraminous bottom 41 is a disc 42, as best noted in FIG. 7, which has an outer diameter smaller than the diameter of the aperture 37 (FIG. 3). A locking unit 43 secures the disc 42 to the foraminous bottom 41. An elongated chain or flexible wire 44, having one end 46 thereof secured to the foraminous bottom 41 (FIG. 2) is disposed in the inner shell 32, with the other end 47 thereof extending over the upper edge of both shells. The purpose of the wire 44 is to facilitate the removal of the incinerator grate 17 from the inner shell 32.

Positioned immediately above the incinerator-grate 17, as viewed in FIG. 2, is the barbecue grate 18. The circularly shaped, imperforated barbecue grate 18 (FIG. 7), has an upstanding lip 49 formed on the periphery thereof. A pair of upstanding, diametrically spaced, V-shaped brackets 51 are secured on the open ends thereof to the lip 49. One end 52 of a chain 53 is secured to each of the brackets 51 at the apex thereof, and the other end 54 of the chain 53 extends over the upper edge of the shells. This grate 18 can be positioned, as shown in phantom and in full line in FIG. 2, at different heights within the inner shell 32 by placing corresponding links of each chain 53 over their respective projections 39, as illustrated in FIG. 5.

The grill device 19 (FIG. 7) includes a grill 56 and a pair of diametrically spaced slidable hooks 57 mounted thereon. The grill 56 is formed from a plurality of laterally spaced parallel rods 58 welded to an outer ring 59. The hooks 57 are U-shaped with the closed end 61 thereof bent at an angle, as best noted in FIG. 7. The open ends 62 of the hooks 57 are formed in a circle for slidably securing each end 62 to one of the rods 58. By positioning the hooks 57 so as to extend substantially perpendicular from the grill 56 and seating the end 61 over the top of the shells, the grill, as viewed in FIG. 2, will be horizontally disposed within the inner shell 32. If the grill is inverted, and the hooks 57 are slid along the rods 58 toward the center of the grill 56, and disposed parallel to the grill, the grill can be positioned to lie across the top of the shells as best noted in FIG. 6.

To protect the internal parts of the apparatus 10, a lid 21 (FIG. 2) is provided. The circularly shaped lid 21 has a depending lip 64 formed on the periphery thereof, and a handle 65 mounted on the top thereof to facilitate the removal of the lid from the apparatus 10. The diameter of the lid 21 is greater than the diameter of the inner shell 32 and smaller than the diameter of the outer shell 22 as observed in FIG. 5. The lid 21 seats on the projections 39, thereby allowing an air gap to exist between the inner shell 32 and the atmosphere. The purpose of the air gap will be described hereinafter. The lid 21 can also be hung on the hook 27, as shown in phantom in FIG. 1.

To operate the combination incinerator and barbecue grill as an incinerator (FIG. 8) the barbecue grate 18, the grill device 19 and the lid 21 are removed, and trash and leaves 63 are dumped into the inner shell 32 and on top of the incinerator grate 17. The contents are ignited from the bottom by holding a flame under the foraminous bottom 41, wherein the flame can pass between the bottom 36 and the disc 42. The air necessary to support combustion, as shown by the arrows in FIG. 8, flows through the aperture 37 and the foraminous bottom 41, around the disc 42 and into the inner shell. The outer shell 22 will remain cool during incineration because of the air passage 33 separating it from the inner shell 32.

To clean the inner shell of ashes and debris, the incinerator grate 17 can be removed by grasping the wire 44 and pulling the grate from the inner shell 32. The ashes and debris will either fall through the aperture 37 or they may be removed from the bottom 36 by pushing them to the aperture 37.

To operate the combination incinerator and barbecue grill as a barbecue grill, charcoal is placed on the barbecue grate 18 and ignited. The grill 19 is placed either on the top of the shells or the slidable hooks 57 are hung on the shells with the grill horizontally disposed within the inner shell 32, depending on the type of cooking desired. The lid 21 may also be placed on the projections to provide an ovenlike arrangement. The air gap between the inner shell 32 and the lid 21 allows the flow of air necessary to support the burning of the charcoal. The barbecue grate 18 can be raised or lowered to give the desired amount of heat.

Although a preferred embodiment of this invention has been described and disclosed hereinbefore, it is to be remembered that various modifications and alternate constructions can be made thereto without departing from the true spirit and scope of the invention as defined in the appended claims.

I claim:

1. A combination incinerator-barbecue grill apparatus comprising in combination:
   portable casing means,
   housing means mounted in said casing means,
   first grate means movably disposed in said housing means,
   second grate means movably disposed in said housing means and located above said first grate means, and
   grill means, for holding edible objects, movably disposed in said housing means and located above said second grate means, wherein said casing means is a vertically disposed cylindrical outer shell open at the top and bottom, and said outer shell has a pair of handles mounted thereon, said handles being disposed diametrically from each other and extending outwardly from said outer shell, and wherein said housing means is a vertically disposed cylindrical inner shell spaced inwardly from said outer shell and is secured thereto by a plurality of holding devices, said inner shell having an open top and a closed bottom, said bottom having a circular aperture formed therein;
   and further wherein said first grate means includes a circular foraminous element, and mounted centrally thereon, a disc having a diameter smaller than the diameter of said housing aperture, said foraminous element being adapted to seat on said bottom.

2. A combination incinerator and barbecue grill apparatus as defined in claim 1, and including further an elongated means disposed in said inner shell and having one end secured to said first grate means and having the other end disposed over the top of said outer shell, said elongated means operable to remove said first grate means from said inner shell.

3. A combiation incinerator and barbecue grill apparatus as defined in claim 2, and further wherein said second grate means has an imperforated circularly shaped bottom with an upstanding lip formed on the periphery thereof, a pair of diametrically spaced chains connected on one end thereof to said lip and extending upwardly therefrom, said inner shell having a pair of upstanding projections diametrically mounted thereon, wherein a link of said chain is movably attachable to said projection for variably positioning said second grate means above said first grate means.

4. A combination incinerator and barbecue grill apparatus as defined in claim 3, and further wherein said grill means includes a grill and a pair of diametrically shaped holding means slidably mounted on said grill, said means adapted to hold said grill in a first horizontally disposed position within said inner shell and in a second horizontally disposed position on top of said inner shell.

5. A combination incinerator and barbecue grill apparatus as defined in claim 4, and including further a plurality of arcuately spaced support means mounted on said outer shell and depending therefrom, and a pair of rotatable wheels, each of said wheels mounted on one of said support means for facilitating the transportability of the apparatus.

6. A combination incinerator and barbecue grill apparatus as defined in claim 5 and including further a plurality of upstanding and arcuately spaced projections mounted on said inner shell.

7. A combination incinerator and barbecue grill apparatus as defined in claim 6, and including further a lid movably disposed on said projections; and an outstanding hook secured to said outer shell for holding said cover means in a second position.

References Cited

UNITED STATES PATENTS

| | | | |
|---|---|---|---|
| 643,593 | 2/1900 | Cox | 110—18 |
| 715,392 | 12/1902 | Koch | 126—25 |
| 2,787,995 | 4/1957 | Alter | 126—25 |
| 2,943,557 | 7/1960 | Svehlsen | 126—25 X |
| 3,105,483 | 10/1963 | Bryan | 126—25 X |
| 3,111,097 | 11/1963 | Dodge | 110—18 |
| 3,179,104 | 4/1965 | Chapman et al. | 126—9 |
| 3,327,697 | 6/1967 | Berlant | 126—25 |
| 3,327,699 | 6/1967 | Uden | 126—25 |
| 3,335,712 | 8/1967 | Marasco | 126—25 |

FREDERICK KETTERER, *Primary Examiner.*